United States Patent
Abergel et al.

(10) Patent No.: US 9,422,449 B2
(45) Date of Patent: Aug. 23, 2016

(54) VARNISH COMPOSITION TRANSFERABLE BY INKJET SUITABLE FOR SUBLIMABLE OR THERMAL-TRANSFER INK

(71) Applicant: MGI FRANCE, Ivry sur Seine (FR)

(72) Inventors: Edmond Abergel, Paris (FR); Pierre Allais, Paris (FR)

(73) Assignee: MGI FRANCE, Ivry sur Seine (FR)

( * ) Notice: Subject to any disclaimer, the term of this patent is extended or adjusted under 35 U.S.C. 154(b) by 0 days.

(21) Appl. No.: 14/395,843

(22) PCT Filed: Apr. 24, 2013

(86) PCT No.: PCT/EP2013/058561
§ 371 (c)(1),
(2) Date: Oct. 21, 2014

(87) PCT Pub. No.: WO2013/160384
PCT Pub. Date: Oct. 31, 2013

(65) Prior Publication Data
US 2015/0126638 A1     May 7, 2015

(30) Foreign Application Priority Data
Apr. 24, 2012  (FR) .................................... 12 53746

(51) Int. Cl.
| | |
|---|---|
| C08F 2/50 | (2006.01) |
| C08F 2/46 | (2006.01) |
| C08G 61/04 | (2006.01) |
| C09D 163/00 | (2006.01) |
| C09D 4/00 | (2006.01) |
| C09D 11/101 | (2014.01) |
| C09D 11/30 | (2014.01) |
| C09D 133/08 | (2006.01) |
| C09D 133/14 | (2006.01) |

(52) U.S. Cl.
CPC ............... *C09D 163/00* (2013.01); *C09D 4/00* (2013.01); *C09D 11/101* (2013.01); *C09D 11/30* (2013.01); *C09D 133/08* (2013.01); *C09D 133/14* (2013.01)

(58) Field of Classification Search
CPC  C09D 163/00; C09D 133/08; C09D 133/14; C09D 4/00; C09D 11/00; C09D 11/30; C09D 133/00; C09D 11/101; C08J 7/00
USPC .................. 522/33, 6, 1, 71, 189, 184; 520/1
See application file for complete search history.

(56) References Cited

U.S. PATENT DOCUMENTS

| | | |
|---|---|---|
| 2005/0176841 A1 | 8/2005 | Krohn |
| 2005/0249895 A1* | 11/2005 | Sisler et al. ............... 428/32.34 |
| 2008/0090929 A1 | 4/2008 | Wilson |
| 2008/0255264 A1 | 10/2008 | Hong |
| 2010/0166975 A1* | 7/2010 | Abergel ........................ 427/511 |
| 2011/0045199 A1 | 2/2011 | Cong |
| 2011/0288198 A1 | 11/2011 | Menon |
| 2015/0073066 A1* | 3/2015 | Abergel et al. ................. 522/28 |

FOREIGN PATENT DOCUMENTS

| | | |
|---|---|---|
| EP | 1 593 521 | 11/2005 |
| EP | 2 204 401 | 7/2010 |
| EP | 2204401 | * 7/2010 |
| KR | 20070039742 | 4/2007 |
| WO | 02/46323 | 6/2002 |

OTHER PUBLICATIONS

International Search Report for corresponding International Application No. PCT/EP2013/058561, mailed Jul. 10, 2013.

* cited by examiner

*Primary Examiner* — Ling Choi
*Assistant Examiner* — Jessica E Whiteley
(74) *Attorney, Agent, or Firm* — Hauptman Ham, LLP

(57) ABSTRACT

The present invention relates to a varnish which is for covering the surface of a substrate and deposited by inkjet, to a process for preparing said varnish and to the use thereof as a laminable and/or overprintable ink or varnish.

35 Claims, 1 Drawing Sheet

| Product name | NAME | % | % | Property |
|---|---|---|---|---|
| Genorad 16 | / | 1 | 1 | Free radical inhibitor, prevents caking of the varnish |
| HDDA | Hexanediol diacrylate | 25 | 25 | Increases reactivity |
| EBECRYL ODA | Octyl-decyl-acrylate | 15.6 | 15.6 | Reduces surface tension and viscosity |
| EBECRYL 5129 | Hexa-functional aliphatic urethane acrylate | 15 | | Heat-sensitive oligomer, increases varnish reactivity, and chiefly varnish resistance to scratches and solvents |
| EBECRYL 870 | Polyester acrylate | | 15 | Heat-sensitive oligomer, increases varnish reactivity and varnish resistance to scratches and solvents |
| Tego Foamex | / | 0.3 | 0.3 | Anti-foam agent |
| IBOA | Isobornyl acrylate | 20 | 20 | Increases reactivity |
| Tego Wett 500 | / | 1 | 1 | Surfactant for good spreading of the varnish over any type of substrate |
| N-vinylcaprolactam | / | 10 | 10 | Adhesion to plastic, chiefly PVC |
| Irgacure 907 | 2 methyl-1-4-methyl thiophenyl-2-4morpholinyl-propanone | 4.9 | 4.9 | Deep and surface photoinitiator |
| Additol ITX | 2-iso-propyl thioxanthone | 7.2 | 7.2 | Surface photoinitiator |
| TOTAL | | 100 | 100 | |
| Viscosity at 25°C (mPa.s) | | 20 | 20 | |

VARNISH COMPOSITION TRANSFERABLE BY INKJET SUITABLE FOR SUBLIMABLE OR THERMAL-TRANSFER INK

The present invention relates to the field of protective layers for substrates, preferably printed substrates, and more particularly to the field of varnishes deposited by inkjet which do not require major heating at the time of deposit.

At the time of printing, an ink is deposited on the surface of a substrate, this substrate possibly being in plastic for example. The printed surface of this substrate is frequently coated with a protective layer. This protective layer completes the fixing of the printed image on the substrate whilst guaranteeing print resistance to some external attack such as splashed liquids, even light, heat or moisture. The depositing of this protective layer on the printed substrate is generally performed by offset, flexography, screen printing or inkjet, to form a protective and/or finishing layer.

Once deposited and hardened, the varnish imparts not only imparts a protective or finishing layer to the substrate but also at times allows additional printing of the varnished substrate via sublimation and/or thermal transfer technology and/or laser marking; this additional printing is generally called personalisation printing or overprinting. One problem in this field therefore concerns the providing of a varnish for inkjet printing which allows such personalisation or overprinting.

In addition, the varnish of the present invention also allows the additional depositing via lamination process of a generally transparent film; as nonlimiting examples mention can be made of PVC, PET, PLA, Polycarbonate films, etc.

These so-called sublimation and/or thermal transfer and/or lamination technologies all involve placing the substrate under pressure and applying a major temperature rise thereto and hence to the varnish of the present invention. One problem related to these techniques concerns the fact that it is therefore important that the varnish should have particular properties which meet these treatment requirements; therefore the varnish of the present invention can advantageously be qualified as "laminable" since once it is deposited and hardened, said varnish is capable of ensuring the property of higher resistance to delamination. Resistance to delamination can be measured using standard ISO/IEC 10373-1. For this measurement a film is deposited on the varnish and said film's resistance to delamination is measured.

The Applicant has unexpectedly found that the varnish of the present invention allows delamination resistance values to be obtained of between 4 and 20 N/cm, for example between 6 and 15 N/cm.

Patent application US 2005/0249895 proposes an example of a coating ink deposited by inkjet, the composition of which notably comprises radiation hardenable oligomers and monomers and at least one photoinitiator to trigger polymerisation and hence the rigidifying of the deposited coating layer. This document proposes a diversified selection from among numerous components to produce said coating ink. However, the choice of these components and the mixture thereof is dictated in proportions of oligomers and monomers which lead to a coating ink having a viscosity of between 15 mPa·s at 40° C. and 8 mPa·s at 70° C. A coating ink having such viscosity requires heating of the heads over fairly high temperature ranges to prevent caking of the varnish. This heating may cause deterioration of the print-heads, these printheads being relatively costly items in printing devices.

It is the objective of the present invention to overcome one or more disadvantages of the prior art by providing a coating ink adapted to limit risks of deterioration of printheads and usable over temperature ranges which do not require major heating of the varnish when it is deposited on the printed substrate.

This objective is reached with a varnish to coat the surface of a substrate and deposited by inkjet, the composition of the varnish at least comprising:
  a hardenable oligomer,
  a hardenable monomer, at least one hardenable monomer captained in the composition being selected from a group formed by alkoxylated and/or poly-alkoxylated acrylic monomers having one or more di- or tri-acrylates; and
  a photoinitiator,
characterized in that at least one hardenable oligomer is selected from among polyesters (preferably hexa-functional) and/or hexa-functional aliphatic urethane acrylates and/or epoxy resins, such that the weight ratio between hardenable oligomer and hardenable monomer is higher than 1:6 and lower than 1:2, and in that the varnish has a viscosity of between 5 and 40 mPa·s at 25° C. and a surface tension of between 19 and 35 mN/m at 25° C.

The varnish of the present invention is not only sensitive to heat but also extremely resistant to delamination which is a major advantage for the applications under consideration.

Other particular aspects and advantages of the varnish of the present invention are detailed in this application.

An additional objective of the invention is to propose a process for producing a particular varnish of the present invention.

This objective is reached by means of a process for producing a varnish of the present invention, which successively comprises:
  a step to mix a viscosity-reducing hardenable monomer with a free radical inhibitor and a photoinitiator at a temperature of between 150 and 300° C.;
  a step to cool the mixture—preferably down to ambient temperature;
  a step to add to the cooled mixture and under agitation at least one hardenable oligomer depending the composition of the varnish, and at least one additional hardenable monomer depending on the composition of the varnish, and any other element included in the composition of the varnish.

Prior art inkjettable hardenable varnishes for forming a protective and/or finishing layer do not allow one or more additional printing steps to be carried out (generally called personalisation printing for loyalty cards, access badges for example, etc.). In general they form a silicon layer which does not allow the transfer and/or adhering of ink for thermal transfer or sublimation printing. In addition, since these techniques subject the varnishes to strong pressures and high temperatures (e.g. in the order of 70 to 220° C.) they are deteriorated during these said steps so that they are no longer able to fulfil their protective and/or finishing functions.

The present invention also concerns the use of the varnish of the present invention as overprint varnish for sublimation and/or thermal transfer technology. For example after it has been deposited on a substrate (whether or not previously printed) then hardened, the varnish can advantageously be used for the step(s) of personalising all or part of the varnish surface. Said varnish therefore allows this or these personalisation steps to be performed using various print technologies well known to the person skilled in the art such as thermal transfer and/or sublimation.

It is known to the person skilled in the art that a film deposited by lamination process for the purpose of forming an additional protective and/or finishing layer must have delamination resistance properties of greater or lesser level depending on the intended application. For this purpose, the depositing of a varnish on the printed (or non-printed) substrate is generally conducted via offset, flexography or screen printing, to increase the adhesion properties of said film. Prior art hardenable varnishes deposited by ink jet for this purpose do not allow these requirements to be met since their resistance to delamination is generally between 0 and 3.5 N/cm (measured as per standard ISO/IEC 10373-1 as specified on the date of filing of this present application).

The present invention therefore also concerns the use of the varnish of the present invention as laminable varnish. For example, after it has been deposited on a substrate (whether or not previously printed) and then hardened, the varnish can be used before the depositing of a film via lamination process on all or part of the surface of the varnish. Said varnish, on account of its resistance to strong pressures and its heat sensitivity (promoting adhesion) over standard temperature ranges of a lamination process (i.e. generally between 100 and 200° C.) allows the adhering of the film to the substrate (whether or not printed) such that the resistance to delamination is between 4 and 20 N/cm (measured as per standard ISO/IEC 10373-1) as specified on the date of filing of the present application), for example between 6 and 15 N/cm.

The present invention also concerns the direct use of the varnish of the present invention—when the composition of said varnish comprises at least one pigment and/or colouring agent such as defined below—as laminable and/or overprintable ink (using sublimation and/or thermal transfer technology). This novel use is of particular industrial advantage since, through the inkjet printing of a single composition according to the present invention, it allows the combining of ink and varnish properties and thereby advantageously allows the requirements of the targeted use to be met.

The invention and its characteristics and advantages will become more clearly apparent on reading the description given with reference to the appended drawing in which:

FIG. 1 shows a Table giving the composition of two varnishes of the invention.

It is to be pointed out that the molecules cited in the present document are not limiting with regard to the composition of the varnish of the invention, but serve to illustrate molecules, monomers or oligomers which have or exhibit identical or similar characteristics, properties or functions.

The present invention relates to a protective varnish intended to coat the surface of a substrate, said substrate possibly being blank or previously printed but not limited thereto. This varnish is produced without a solvent; this varnish is therefore preferably free of water and organic solvent such as methyl isobutyl ketone, methyl ethyl ketone, dimethyl ketone, isopropyl alcohol, isobutyl alcohol, n-butyl alcohol, ethyl acetate, n-butyl acetate, ethyl cellosolve, butyl cellosolve for example and other similar solvents.

Said varnish therefore includes in its composition at least one hardenable oligomer, a hardenable monomer and a photoinitiator.

According to the present invention at least one of the hardenable monomers is preferably an alkoxylated and/or poly-alkoxylated acrylic monomer comprising one or more di- or tri-acrylates.

According to the present invention, at least one hardenable oligomer is selected from among polyesters—preferably hexa-functional—and/or hexa-functional aliphatic urethane acrylates and/or epoxy resins. This or these particular hardenable oligomers represent at least 75 weight % of the total weight of hardenable oligomers, preferably at least 95% of the total weight of the hardenable oligomers or even the entirety of the hardenable oligomers in the composition of the varnish of the present invention.

The hardenable oligomer or this mixture of hardenable oligomers is intended to increase the suppleness and flexibility of the varnish composition. This hardenable oligomer is associated in the composition of the varnish with one or preferably several hardenable monomers which take part in other properties of the varnish. In particular this hardenable oligomer allows a varnish to be obtained that is deposited for example by inkjet machine onto a substrate, this substrate subsequently being compatible with print machines using ink thermal transfer or sublimation technology.

In some preferred embodiments of the present invention, the hardenable oligomers exhibit viscosity higher than 1 Pa·s at 23° C. The objective of the hardenable oligomer and/or mixture of oligomers is effectively to increase the reactivity of the varnish composition and the chemical and physical resistance thereof, to scratching for example. This oligomer is associated in the varnish composition with different monomers which participate in other properties of the varnish. Depending on the type of hardenable oligomer used and the desired viscosity level for the varnish, the weight ratio between hardenable oligomer and hardenable monomer in the varnish composition has a value of between 1:2 and 1:6 depending on the hardenable oligomer or mixture of hardenable oligomers used: this weight ratio is preferably higher than 1:5 and/or lower than 1:3; for example this weight ratio is in the order of 1:4.

Depending on the type of varnish it is sought to produce, i.e. depending on the type of desired physical characteristics of the substrate to be coated, the choice of hardenable oligomer may change. However, the viscosity of the hardenable oligomer is preferably between 5 and 70 Pa·s, even more preferably between 20 and 60 Pa·s at 25° C. For example but not limited thereto, if it is sought to obtain a varnish having extensive reactivity that is scratch-resistant and solvent-resistant, the choice of oligomer will turn to a polyester acrylate, preferably a hexa-functional polyester acrylate e.g. a hexa-functional polyester acrylate commonly available under the trade name EBECRYL 870. As examples, mention can also be made of the polyester acrylates CN2295, CN291, CN293 and Ebecryl 830. The polyester acrylate can be replaced by—or advantageously mixed with—the hexa-functional aliphatic urethane acrylate available under the reference EBECRYL 5129. The use of this oligomer will be preferred if greater scratch-resistant and solvent-resistant properties of the varnish are required. As non-limiting examples mention can also be made of the hexa-functional aliphatic urethane acrylates CN9210, CN9215, Ebecryl 8254 and Ebecryl 1290. The hardenable oligomer can also be selected from among epoxy resins which are advantageously adapted to the objective(s) of the invention. As examples the following can be cited: Bisphenol-A epoxy diacrylate available under the trade name EBECRYL 605 or CN 104, CN 109, EBECRYL 648, EBECRYL 3105 or a mixture of two or more of the aforementioned epoxy oligomers. The use of such oligomers advantageously allows varnishes to be obtained that are resistant to delamination, in particular varnishes including such oligomers have surface tension properties that are particularly high, for example higher than 19 mN/m at 25° C.

In some embodiments of the present invention, mixtures or hardenable oligomers can be envisaged, and in particular mixtures grouping together the different hardenable oligomers cited above (or below) so that the composition of the mixture allows a varnish to be obtained having common even intermediate properties.

In some embodiments of the present invention, the hardenable oligomers represent 5 to 25 weight % of the varnish e.g. 10 to 25 weight % of the varnish, for example in the order of 15 weight % of the varnish. These proportions remain the same if a mixture of two (or more) oligomers is used in the varnish composition.

In some preferred embodiments of the present invention, the hardenable oligomers are not hyper-branched oligomers (also called dendrimers). Amongst the additional hardenable oligomers which could be included in the composition of the varnish of the present invention, as examples mention is made of urethane and/or polyester compounds which do not come under the definition of the particular oligomers essential for the present invention; if used these additional hardenable oligomers are to be taken into account in the weight calculations of all the hardenable oligomers.

The hardenable monomers which complete the composition of the varnish, in addition to contributing hardening capability, are selected in relation to their properties.

According to the present invention, at least one of the hardenable monomers is an alkoxylated and/or poly-alkoxylated acrylic monomer comprising one or more di- or tri-acrylates. These types of monomers allow the reactivity of the varnish to be increased and will be called "reactivity function monomers" of the varnish in the present description and the following claims. As non-limiting examples of these di- or tri-acrylate hardenable monomers, mention is made of hexanediol di-acrylate known under the trade name HDDA. The reactivity function monomers may represent the entirety of the hardenable monomers of the varnish of the present invention. However, in one preferred variant of embodiment of the present invention, the reactivity function monomers represent 15 to 40 weight % of the varnish, for example 15 to 30 weight % of the varnish e.g. in the order of 25 weight % of the varnish. As non-limiting examples of di-acrylate monomers mention can also be made of dipropyleneglycol diacrylate, tripropylene glycol diacrylate, polyethylene glycol diacrylate, propoxylated neopentylglycol diacrylate, esterdiol diacrylate (EDDA) and/or triethylene glycol diacrylate (TIEGDA). As non-limiting examples of tri-acrylate monomers the following can also be cited: trimethylol propane tri-acrylate, propoxylated glycerol tri-acrylate, propoxylated (3) trimethylolpropane triacrylate (TMP3POTA) and/or ethoxylated (6) trimethylolpropane triacrylate (TMP6EOTA).

Among the other hardenable monomers possibly completing the composition of the varnish, there are function monomer(s) which ensure adhesion to the substrate called "adhesion function monomer" of the varnish in the present description and the following claims. As preferred example mention is made of N-vinylcaprolactam which allows a considerable improvement in adhesion of the varnish on substantially rigid surfaces such as plastics or PVCs (polyvinyl chlorides). The adhesion function monomer may represent 10 to 25 weight % of the varnish, preferably 8 to 15 weight % of the varnish, for example in the order of 10% of the weight of the varnish.

Therefore in some preferred embodiments of the present invention, the varnish in addition to the hardenable oligomer or mixture of oligomers and the photoinitiator, comprises at least two hardenable monomers, the first being selected from among the reactivity function monomers and the second being selected from among the adhesion function monomers.

Amongst the other hardenable monomers possibly completing the composition of the varnish, there are the function monomer(s) which allow a reduction in the viscosity of the varnish called "viscosity function monomer" of the varnish in the present description and the following claims. As non-limiting examples, although preferred, mention is made of the aliphatic alkyl acrylates having more than five carbon atoms; for example octyl-decyl-acrylate (which also has the property of restricting surface tensions in the varnish) and 3,3,5-trimethyl cyclohexanol acrylate, respectively known under the trade names EBECRYL ODA and SR 420. The viscosity function monomer may represent 5 to 25 weight % of the varnish, preferably 12 to 18 weight % of the varnish, e.g. in the order of 15.6 weight % of the varnish. As non-limiting examples of viscosity function monomers mention is also made of 2(2ethoxyethoxy)ethyl acrylate (EOEOEA), Tetrahydrofurfuryl acrylate (THFA), octyl acrylate, isodecyl acrylate (IDA), 3,3,5 trimethyl cyclohexyl acrylate (TMCHA), iso octyl acrylate (IOA), Tridecyl acrylate (TDA), 2-(2-ethoxyethoxy) ethyl acrylate and/or Cyclic Trimethylpropane Formal Acrylate (CTFA).

Therefore, in some preferred embodiments of the present invention the varnish, in addition to the hardenable oligomer and photoinitiator, comprises at least three hardenable monomers, the first being selected from among the reactivity function monomers, the second being selected from among the adhesion function monomers and the third being selected from among the viscosity function monomers.

Amongst the other hardenable monomers possibly completing the composition of the varnish, there are polyvalent function monomer(s) that are called "polyvalent function monomer" of the varnish in the present description and the following claims. This type of "polyvalent function monomer" may effectively have several simultaneous functions such as effect on viscosity and/or adhesion and/or further additional properties. As non-limiting example mention is made of the family of hardenable monomers of cycloacrylate type, in particular isobornyl acrylate (IBOA). These additional hardenable monomers may represent 15 to 25% by weight of the varnish, preferably 18 to 22 weight % of the varnish, for example in the order of 20 weight % of the varnish.

In some advantageous embodiment, the varnish in addition to the three above-described types of monomers may comprise at least a fourth polyvalent function monomer.

When the varnish is sprayed onto the substrate surface, the polymerisation reaction is initiated by at least one photoinitiator which may be a deep or surface photoinitiator. These photoinitiators for example are Additol ITX which corresponds to 2-iso-propyl-thioxanthone and/or Irgacure 907 which corresponds to 2-methyl-1-4-methylthiophenyl-2-4-morpholinyl-propanone. These photoinitiators allow the triggering of the varnish polymerisation reaction solely in the presence of UV radiation. The absorption peaks used to ensure the formation of free radicals which initiate polymerisation of the varnish generally have a wavelength in the order of 300 to 390 nm for Additol ITX and a wavelength in the order of 230 to 304 nm for Irgacure 907. This radiation can be obtained for example using a device arranged in the print system using the varnish. Others could be used as such for example and not limited thereto benzophenone, 2,4,6-tri-methylbenzoyl-di-phenyl phosphine oxide, 1-hydroxy-cyclo-hexyl-phenyl-ketone, iso-propylthioxanthone, n-methyl-diethanolamine or di-phenyl (2,4,6-trimethyl-benzoyl)-phosphine oxide. The photoinitiators may represent less than 20 weight % of the varnish, preferably 8 to 15 weight % of the varnish e.g. in the order of 12 weight % of the varnish. In some preferred embodiments of the present invention, the varnish comprises Additol ITX and Irgacure 907 with Additol ITX representing 4.0 to 10.0 weight % of the varnish e.g. in the order of 7.2 weight % of the varnish, and Irgacure 907 representing 2.0 to 4.9 weight % of the varnish, e.g. 4.9 weight % of the varnish. As non-limiting examples of photoinitiator mention is also made of 2,4,6-trimethylbenzophenone, 4-methylbenzophenone, Benzyldimethylketal, 2-hydroxy-2-methyl-1-phenyl-1-propanone and/or ethyl-4-dimethylamino benzoate.

To obtain optimal spreading of the varnish on the substrate surface, the composition of the varnish according to the present invention may advantageously integrate a surfactant which for example may be the mixture listed under the trade name Tego Wett 500. For example, but not limited thereto although preferred, the surfactants used may be "silicone-free" surfactants. The surfactant may represent less than 3 weight % of the varnish, preferably 0.1 to 2.0 weight % of the varnish e.g. in the order of 1.0 weight % of the varnish.

To prevent caking of the varnish under the action of heat under undesired conditions, the varnish of the present invention may integrate an antioxidant which acts as free radical inhibitor. This inhibition can be obtained for example by integrating in the composition a mixture referenced under the trade name Genorad 16 or Additol S110. The antioxidant may represent less than 3 weight % of the varnish, preferably 0.1 to 2.0 weight % of the varnish e.g. in the order of 1.0 weight % of the varnish.

Therefore in some embodiments of the present invention the varnish (to coat the surface of a substrate and deposited by inkjet) has a composition which at least includes:
  a hardenable oligomer;
  a hardenable monomer;
  a photoinitiator;
  a surfactant; and
  an antioxidant.

These five components preferably represent at least 70 weight % of the varnish, preferably at least 85 weight %, for example at least 95 weight % or even the whole of the varnish of the present invention.

The different components which allow the producing of the varnish of the invention can also be mixed in determined proportions. As non-limiting example it is possible to have the following:
  the inhibitor: Genorad 16, contained in a proportion of 0.1 to 2.0%, preferably in a proportion of 1.0% of the final mixture;
  the surfactant: Tego Wett 500 contained in a proportion of 0.1 to 2.0%, preferably in a proportion of 1.0% of the final mixture;
  the deep and/or surface photoinitiators: contained in a proportion of 8 to 15%, preferably in a proportion of 12%, respectively with Additol ITX in a proportion of 4.0 to 10.0%, preferably 7.2%, and Irgacure 907 in a proportion of 2.0 to 4.9%, preferably 4.9% of the final mixture;
  the function monomer ensuring adhesion to the substrate i.e. N-vinylcaprolactam contained in a proportion of 8 to 15%, preferably in a proportion of 10% of the final mixture;
  the polyvalent function monomer i.e. isobornyl acrylate (IBOA) contained in a proportion of 15 to 25%, preferably in a proportion of 20% of the final mixture;
  the function monomer which improves the reactivity of the mixture i.e. hexanediol di-acrylate (HDDA) contained in a proportion of 15 to 30%, preferably in a proportion of 25% of the final mixture;
  the function monomer which allows a reduction in surface tension and viscosity i.e. EBECRYL ODA contained in a proportion of 12 to 18%, preferably in a proportion of 15.6% of the final mixture;
  the heat-sensitive oligomer e.g. a polyester acrylate and/or a hexa-functional aliphatic urethane acrylate i.e. EBECRYL 870 or EBECRYL 5129 respectively and/or the epoxy resin, is contained in a proportion of 5 to 25 weight % of the resin, for example 10 to 25% and preferably in a proportion of 15% of the final mixture. These proportions remain the same if a mixture of two of these oligomers is used.

Depending on the type of varnish it is desired to produce, additional elements can be added to the components.

Thus, for the design of a matt or satin varnish matting agents can be added to the mixture.

To obtain a glitter varnish, glitter can be added.

In some embodiments of the present invention, the varnish to coat the surface of a substrate and deposited by inkjet is characterized in that the composition of the varnish comprises at least one colouring agent. This makes it possible to impart a particular colour to the ink.

The colouring agent can be selected from among dyes, pigments or a combination of pigments and/or dyes. In some embodiments of the present invention, the colouring agent represents 0.1 to 35 weight % of the varnish, preferably in the order of 1 to 10 weight % of the varnish. These highest concentrations of colouring agent generally concern white colouring agents.

Coatings of transparent varnish have a preferred concentration of 0% colouring agent.

Examples of suitable pigments, but not limited thereto, are those known under the name Pigment Blue (e.g. Pigment Blue 1, 15, 15:1, 15:2, 15:3; 15:4, 15:6, 16, 24 or 60), Pigment Brown (e.g. Pigment Brown 5, 23 or 25), Pigment Yellow (e.g. Pigment Yellow 3, 14, 16, 17, 24, 65, 73, 74, 83, 95, 97, 108, 109, 110, 113, 120, 128, 129, 138, 139, 150, 154, 156 or 175), Pigment Green (e.g. Pigment Green 1, 7, 10 or 36), Pigment Orange (e.g. Pigment Orange 5, 15, 16, 31, 34, 36, 43, 48, 51, 60, 61 or 71), Pigment Red (e.g. Pigment Red 4, 5, 7, 9, 22, 23, 48, 48:2, 49, 112, 122, 123, 149, 166, 168, 170, 177, 179, 190, 202, 206, 207 or 224), Pigment Violet (e.g. Pigment Violet 19, 23, 32, 37 or 42), Pigment Black (e.g. Pigment Black 6 or 7), the numberings of the colour pigments corresponding to the "Colour Index, Volumes 1-8, published by the Society of Dyers and Colourists, Yorkshire England"; mention is also made of Black PB 2 and 5; carbon black; titanium dioxide (including rutile and anatase); zinc sulphate; or a mixture of two or more of the aforementioned pigments.

When a pigment is used in the ink compositions of the present invention it is preferred to proceed by pre-dispersing said pigment in one or more hardenable monomers and/or hardenable oligomers, before incorporating the latter in the varnish. It is also preferred to use dispersing agents to improve the stability of the pigment dispersion; these dispersing agents allow any phenomenon of deposit and/or agglomeration of the pigments to be reduced and even prevented.

The present invention therefore also concerns the direct use of the varnish of the present invention—when the composition of said varnish comprises at least one pigment and/or a dye such as defined below—as laminable ink and/or overprint ink (in sublimation and/or thermal transfer technology). This novel use is of particular industrial interest since via inkjet printing of a single composition according to the invention it becomes possible to combine ink and varnish properties and thereby advantageously meet the requirements of the targeted use.

The varnish may integrate at least one resin in its composition—differing from the resins of hardenable oligomer type already cited above—selected from among acrylic, vinyl, ketonic, polyester and aldehyde resins. This resin can be added to the composition in a proportion of the order of 5 to 10 weight % of the final mixture. The choice of resin depends on the substrate and the sought after result. For example, these resins have properties of improving the chemical resistance of the final composition and the mechanical resistance of the deposited varnish. One example of a vinyl resin able to provide properties of adhesion to the substrate may be the resin known under the reference VYHH.

The production of the varnish of the invention is implemented by successively performing:
- a step to mix the viscosity reducer with the free radical inhibitor and a photoinitiator at a temperature of between 150 and 300° C. depending on the required mixing speed;
- a step to cool the mixture down to ambient temperature;
- a step to add under agitation at least one hardenable oligomer depending on the composition of the varnish and/or at least one hardenable monomer depending on the composition of the varnish, and any other element included in the composition of the varnish.

According to one preferred operating mode, the surfactant is added last to prevent the formation of foam during agitation of the components when they are being mixed. To limit this onset of foam, anti-foam agents can be added to the mixture, such as polyether siloxane. This anti-foam agent is added in a proportion of 0.1 to 1.0 weight % of the varnish, preferably 0.3 weight %. One example of an anti-foam agent which can be used is Tego Foamex 805.

Therefore in some embodiments of the present invention, the varnish (to coat the surface of a substrate and deposited by inkjet) has a composition which at least comprises:
- a hardenable oligomer;
- a hardenable monomer;
- a photoinitiator;
- a surfactant;
- an antioxidant; and
- an antifoam agent.

These six components preferably represent at least 70 weight % of the varnish, preferably at least 85 weight %, for example at least 95 weight % or even the whole of the varnish of the present invention.

The production process may also comprise a step to filter the mixture obtained to a particle size adapted to pass through a nozzle when being inkjetted onto the substrate. Ink-jetting can be performed using any known inkjet technique, preferably the Drop on Demand technique—DOD whereby an overpressure is formed using a piezoelectric component which curves under the effect of an electric voltage to reduce the volume of the ink reservoir. Since the varnish is sprayed via a nozzle it is essential that the particle size of the varnish components should not lead to clogging of the nozzle. Filtering is therefore performed to a particle size of 10 μm or less, preferably down to 5 μm and optimally down to 1 μm.

In some embodiments the varnish to coat the surface of a substrate and deposited by inkjet thereupon is characterized in that the proportion ratio between oligomer and monomer is between 1:5 and 1:3, for example in the order of 1:4.

In some embodiments, the varnish to coat the surface of a substrate and deposited by inkjet is characterized in that the varnish is adapted for printing via thermal transfer or sublimation.

In some embodiments the varnish to coat the surface of a substrate and deposited by inkjet is characterized in that the hardenable oligomer is a mixture between an oligomer selected from a group of the family of polyesters and/or a hexa-functional aliphatic urethane acrylate and/or an epoxy resin, the proportion ratio between oligomer and monomer preferably being between 1:5 and 1:3, for example in the order of 1:4.

In some embodiments, the varnish to coat the surface of a substrate and deposited by inkjet is characterized in that the varnish comprises an antioxidant which acts as free radical inhibitor to prevent caking of the varnish under the action of heat under undesired conditions, and an octyl-decyl-acrylate or trimethyl cyclohexanol acrylate to allow a reduction in the viscosity of the varnish.

In some embodiments, the varnish to coat the surface of a substrate and deposited by inkjet is characterized in that the varnish composition at least comprises:
- a viscosity reducer which facilitates adhesion of the varnish to the substrate and/or
- a free radical inhibitor.

In some embodiments, the varnish to coat the surface of a substrate and deposited by inkjet is characterized in that the mixture of varnish components has a conductivity of less than 0.8 μS.

In some embodiments, the varnish to coat the surface of a substrate and deposited by inkjet is characterized in that the photo-initiator comprises at least 2-methyl-1-4-methyl-thiophenyl-2-4-morpholinyl-propanone.

In some embodiments, the varnish to coat the surface of a substrate and deposited by inkjet is characterized in that the photo-initiator comprises at least 2-isopropyl-thioxanthone.

In some embodiments, the varnish to coat the surface of a substrate and deposited by inkjet is characterized in that the varnish comprises N-vinylcaprolactam to ensure adhesion of the varnish onto the surface of the printed substrate.

In some embodiments, the varnish to coat the surface of a substrate and deposited by inkjet is characterized in that the hardenable oligomer comprises at least a hexa-functional polyester acrylate.

In some embodiments, the varnish to coat the surface of a substrate and deposited by inkjet is characterized in that the hardenable oligomer comprises at least an epoxy resin.

In some embodiments, the varnish to coat the surface of a substrate and deposited by inkjet is characterized in that the hardenable monomer comprises at least a hexanediol diacrylate.

A further objective of the invention is to propose a process allowing the production of a varnish according to the invention.

This objective is reached with a process for producing a varnish to coat the surface of a substrate and deposited by inkjet, the process comprising:
- a step to mix a viscosity reducer with the free radical inhibitor and a photoinitiator at a temperature of between 150 and 300° C.;
- a step to cool the mixture down to ambient temperature;
- a step to add under agitation at least one hardenable monomer depending on the composition of the varnish.

characterized in that the process comprises a step to add under agitation at least one hardenable oligomer depending on the composition of the varnish, selected from a group of the family of polyesters and/or hexa-functional aliphatic urethane acrylate and/or epoxy resin.

According to one particular aspect the process for producing a varnish to coat the surface of a substrate and deposited by inkjet is characterized in that the process comprises a step to filter mixture obtained to an adapted particle size so that it passes through a nozzle when deposited by inkjet on the substrate.

According to one preferred operating mode, but the invention not being limited thereto, the physical parameters of the components or composition of the application are determined at the indicated temperatures and under usual pressure conditions on the earth's surface, preferably in the order of one atmosphere (1013 mBars). Viscosity can thus be measured using a HAAKE Viscotester 550 equipped with NV Cup and NV Rotor which are known measuring instruments marketed by ThermoFisher and use a temperature regulation system connected to a thermostat-controlled bath to hold the varnish sample at a temperature of 25[deg]C. Similarly, the surface tension is measured using a DSA 100 tensiometer using the Pendant Drop method marketed by KRÜSS. Particle size and conductivity are respectively measured using particle size measurement apparatus called MASTERSIZER 2000 marketed by MALVERN, and a CYBERSCAN CON 11 conductivity meter made by EUTECH INSTRUMENTS equipped with a measuring cell referenced ECCONSEN91W/35608-50 and having a cell constant of K=1.0.

It will be obvious for the person skilled in the art that the present invention allows embodiments under numerous other specific forms without departing from the field of application of the invention as claimed. Therefore the described embodiments are to be construed as illustrations which can be modified within the field defined by the scope of the appended claims.

The invention claimed is:

1. A varnish configured to coat a surface of a substrate and to be deposited by inkjet, the composition of the varnish at least comprising:
   at least one hardenable oligomer;
   a hardenable monomer, at least one hardenable monomer contained in the composition being selected from a group formed by alkoxylated and/or poly-alkoxylated acrylic monomers having one or more di- or tri-acrylates; and
   a photoinitiator;
   wherein
      the varnish has a surface tension between 19 and 35 mN/m at 25° C.,
      said at least one hardenable oligomer comprises epoxy resin, alone or in combination with at least one another oligomer selected from among polyesters and/or hexa-functional aliphatic urethane acrylates, and
      the varnish has a weight ratio between total hardenable oligomer and total hardenable monomer higher than 1:6 and lower than 1:2 while said hardenable oligomer has a viscosity greater than 1 Pa·s at 23° C., such that the varnish has a viscosity between 5 and 40 mPa·s at 25° C.

2. The varnish according to claim 1 having a resistance to delamination between 4 and 20 N/cm, the resistance being measured as per standard ISO/IEC 10373-1.

3. The varnish according to claim 1, wherein the polyesters and/or hexa-functional aliphatic urethane acrylates represent at least 75 weight % of the hardenable oligomer.

4. The varnish according to claim 1, wherein the weight ratio between hardenable oligomer and hardenable monomer is higher than 1:5 and/or lower than 1:3.

5. The varnish according to claim 1, wherein the hardenable oligomers represent 5 to 25 weight % of the varnish.

6. The varnish according to claim 1, wherein the alkoxylated and/or poly-alkoxylated acrylic monomers having one or more di- or tri-acrylates represent 15 to 40 weight % of the varnish.

7. The varnish according to claim 1, wherein the di-acrylate and tri-acrylate monomers are selected from among hexanediol di-acrylate (HDDA), dipropyleneglycol diacrylate, tripropylene glycol diacrylate, polyethylene glycol diacrylate, propoxylated neopentylglycol diacrylate, esterdiol diacrylate (EDDA), triethylene glycol diacrylate (TIEGDA), trimethylol propane tri-acrylate, propoxylated glycerol triacrylate, propoxylated (3) trimethylolpropane triacrylate (TMP3POTA), ethoxylated (6) trimethylolpropane triacrylate (TMP6EOTA), or a mixture of two or more of these monomers.

8. The varnish according to claim 1, wherein the hardenable monomers completing the composition of the varnish comprise at least one function monomer which is adhesion function monomer to ensure adhesion to the substrate.

9. The varnish according to claim 8, wherein the adhesion function monomer represents 10 to 25 weight % of the varnish.

10. The varnish according to claim 1, wherein the hardenable monomers completing the composition of the varnish comprise at least one function monomer which is viscosity function monomer to allow a reduction in the viscosity of the varnish.

11. The varnish according to claim 10, wherein the viscosity function monomer is selected from among aliphatic alkyl acrylates having more than five carbon atoms, including octyl-decyl-acrylate, 3,3,5, trimethyl cyclohexanol acrylate, 2(2ethoxyethoxy)ethyl acrylate (EOEOEA), Tetrahydrofurfuryl acrylate (THFA), octyl acrylate, isodecyl acrylate (IDA), 3,3,5 trimethyl cyclohexyl acrylate (TM-CHA), iso octyl acrylate (IOA), Tridecyl acrylate (TDA), 2-(2-ethoxyethoxy)ethyl acrylate, Cyclic Trimethylopropane Formal Acrylate (CTFA) or a mixture of two or more of these monomers.

12. The varnish according to claim 11, wherein the viscosity function monomer represents 5 to 25 weight % of the varnish.

13. The varnish according to claim 1, wherein the photoinitiator is selected from among 2-iso-propyl-thioxanthone, 2-methyl-1-4-methylthiophenyl-2-4-morpholinyl-propanone, benzo-phenone, 2,4,6-tri-methyl-benzoyl-diphenyl phosphine oxide, 1-hydroxy-cyclo-hexyl-phenyl-ketone, n-methyl-diethanolamine, di-phenyl (2,4,6-tri-methyl-benzoyl)-phosphine oxide, or a mixture of two or more of these photoinitiators.

14. The varnish according to claim 1, wherein the photoinitiator represents less than 20 weight % of the varnish.

15. The varnish according to claim 1, wherein the composition of the varnish also comprises:
   at least one surfactant; and/or
   at least one antioxidant; and/or
   at least one anti-foam agent.

16. The varnish according to claim 15, wherein the varnish comprises at least the six following components:
   hardenable oligomer,
   hardenable monomer,
   photoinitiator,
   surfactant, antioxidant, and
anti-foam agent,
these six components representing at least 70 weight % of the varnish.

17. The varnish according to claim 1, wherein the composition of the varnish also comprises one or more colouring agents representing 0.1 to 35 weight % of the varnish.

18. The varnish according to claim 1, wherein at least one hardenable oligomer is selected from hexa-functional polyester acrylates.

19. The varnish according to claim 2 having the resistance to delamination between 6 and 15 N/cm.

20. The varnish according to claim 1, wherein the polyesters and/or hexa-functional aliphatic urethane acrylates represent at least 95 weight % of the hardenable oligomer.

21. The varnish according to claim 1, wherein the hardenable oligomers represent 10 to 25 weight % of the varnish.

22. The varnish according to claim 1, wherein the hardenable oligomers represent 15 weight % of the varnish.

23. The varnish according to claim 1, wherein the alkoxylated and/or poly-alkoxylated acrylic monomers having one or more di- or tri-acrylates represent 15 to 30 weight % of the varnish.

24. The varnish according to claim 1, wherein the alkoxylated and/or poly-alkoxylated acrylic monomers having one or more di- or tri-acrylates represent 25 weight % of the varnish.

25. The varnish according to claim 1 wherein the hardenable monomers completing the composition of the varnish comprise at least N-vinylcaprolactam.

26. The varnish according to claim 8, wherein the adhesion function monomer represents 8 to 15 weight % of the varnish.

27. The varnish according to claim 8, wherein the adhesion function monomer represents 10 weight % of the varnish.

28. The varnish according to claim 10, wherein the viscosity function monomer represents 12 to 18 weight % of the varnish.

29. The varnish according to claim 10, wherein the viscosity function monomer represents 15.6 weight % of the varnish.

30. The varnish according to claim 1, wherein the photoinitiator represents 8 to 15 weight % of the varnish.

31. The varnish according to claim 1, wherein the photoinitiator represents 12 weight % of the varnish.

32. The varnish according to claim 16, wherein said six components represent at least 85 weight % of the varnish.

33. The varnish according to claim 16, wherein said six components represent at least 95 weight % of the varnish.

34. The varnish according to claim 16, wherein said six components represent an entirety of the varnish.

35. The varnish according to claim 1, wherein the composition of the varnish also comprises one or more colouring agents representing 1 to 10 weight % of the varnish.

* * * * *